United States Patent [19]

Gifford

[11] 4,426,045

[45] Jan. 17, 1984

[54] BAIL TRIP MECHANISM FOR FISHING REEL

[75] Inventor: Richard L. Gifford, Tulsa, Okla.

[73] Assignee: Brunswick Corporation, Skokie, Ill.

[21] Appl. No.: 333,343

[22] Filed: Dec. 22, 1981

Related U.S. Application Data

[63] Continuation of Ser. No. 85,926, Oct. 18, 1979, abandoned.

[51] Int. Cl.³ .................................................. A01K 89/01
[52] U.S. Cl. .................................................. 242/84.2 G
[58] Field of Search .................. 242/84.21 R, 84.26, 242/84.2 R, 84.2 F

[56] References Cited

U.S. PATENT DOCUMENTS

| 2,599,189 | 6/1952 | Mauborgne | 242/84.6 |
| 3,946,963 | 3/1976 | Oberg | 242/84.21 R |
| 4,005,832 | 1/1977 | Yamazaki | 242/84.21 R |
| 4,245,797 | 1/1981 | Tissot | 242/84.2 G |

FOREIGN PATENT DOCUMENTS

| 2806826 | 8/1978 | Fed. Rep. of Germany | 242/84.2 G |
| 2824740 | 12/1978 | Fed. Rep. of Germany | 242/84.21 R |
| 2852934 | 7/1979 | Fed. Rep. of Germany | 242/84.2 G |

Primary Examiner—Billy S. Taylor
Attorney, Agent, or Firm—John G. Heimovics

[57] ABSTRACT

This invention comprehends a mechanism that automatically moves a fishing reel bail from the open casting position to the closed retrieving position. Mounted in the rotor is a trip lever arm that cooperates with a cam mounted on the face of the fishing reel housing. A trip lever arm also mates with a second cam mounted on the bail arm pivot means.

24 Claims, 13 Drawing Figures

BAIL TRIP MECHANISM FOR FISHING REEL

This is a continuation of application Ser. No. 85,926 filed Oct. 18, 1979, now abandoned.

BACKGROUND OF THE INVENTION

1. Field of the Invention

This invention relates to spinning style fishing reels, and more particularly, relates to a mechanism that causes the bail of the fishing reel to pivot automatically from the casting position to the retrieving position.

2. Background of the Prior Art

It is well known in the prior art of the fishing reels to cause the bail to automatically move from the casting position to the retrieving position. There have been attempts to make manual override systems for the automatic bail trip mechanism in spinning reels with one such mechanism being taught in U.S. patent application Ser. No. 932,850, filed Aug. 11, 1968, by Elvis W. Moss and now abandoned. Another automatic bail closing device is taught in U.S. application Ser. No. 932,791, filed Aug. 11, 1968, by R. R. Councilman et al., now abandoned, which does not have a manual override.

In another automatic bail closing mechanism which is taught in U.S. Pat. No. 4,098,473 a J-shaped lever is mounted within the ear of a bail arm support with an actuation spring located within the J-shaped arm. The arm moves back and forth in the ear by means of the cam mounted on the fishing reel housing. However, assembly of the reel mechanism is time-consuming and the mechanism is hard to operate.

In all these prior art devices, a simple mechanism using sliding arm that provides a bail trip that is quickly assembled and disassembled and which provides good positive action is not taught.

SUMMARY OF THE INVENTION

This invention relates to a spinning style fishing reel and comprehends an improved means for permitting the bail of the fishing reel to pivot from its casting position to its retrieving position.

It is therefore an object of this invention to provide a spinning style fishing reel with a mechanism that automatically moves the fishing reel bail from the open casting position to the closed retrieving position with very little cranking effort.

It is another object of this invention to provide such a bail closing mechanism that is incorporated totally within the rotor portion of a fishing reel.

Yet another object of this invention is the provision for such a bail closing operation whereby a trip lever is mounted in one of the ears of the fishing reel and is slidably moved within the rotor by a cam located on the face of the fishing reel housing.

And yet another object of this invention is to utilize the provisions of a very simple Z-shaped bail trip lever.

Still another object of this invention is the provision for a spring that is mounted on the rotor providing constant force for the lever arm.

The above and other and further objects and features will be more readily understood by reference to the following detailed description and accompanying drawings.

DESCRIPTION OF BASIC STRUCTURE AND OPERATION OF FISHING REEL

Figure 1:
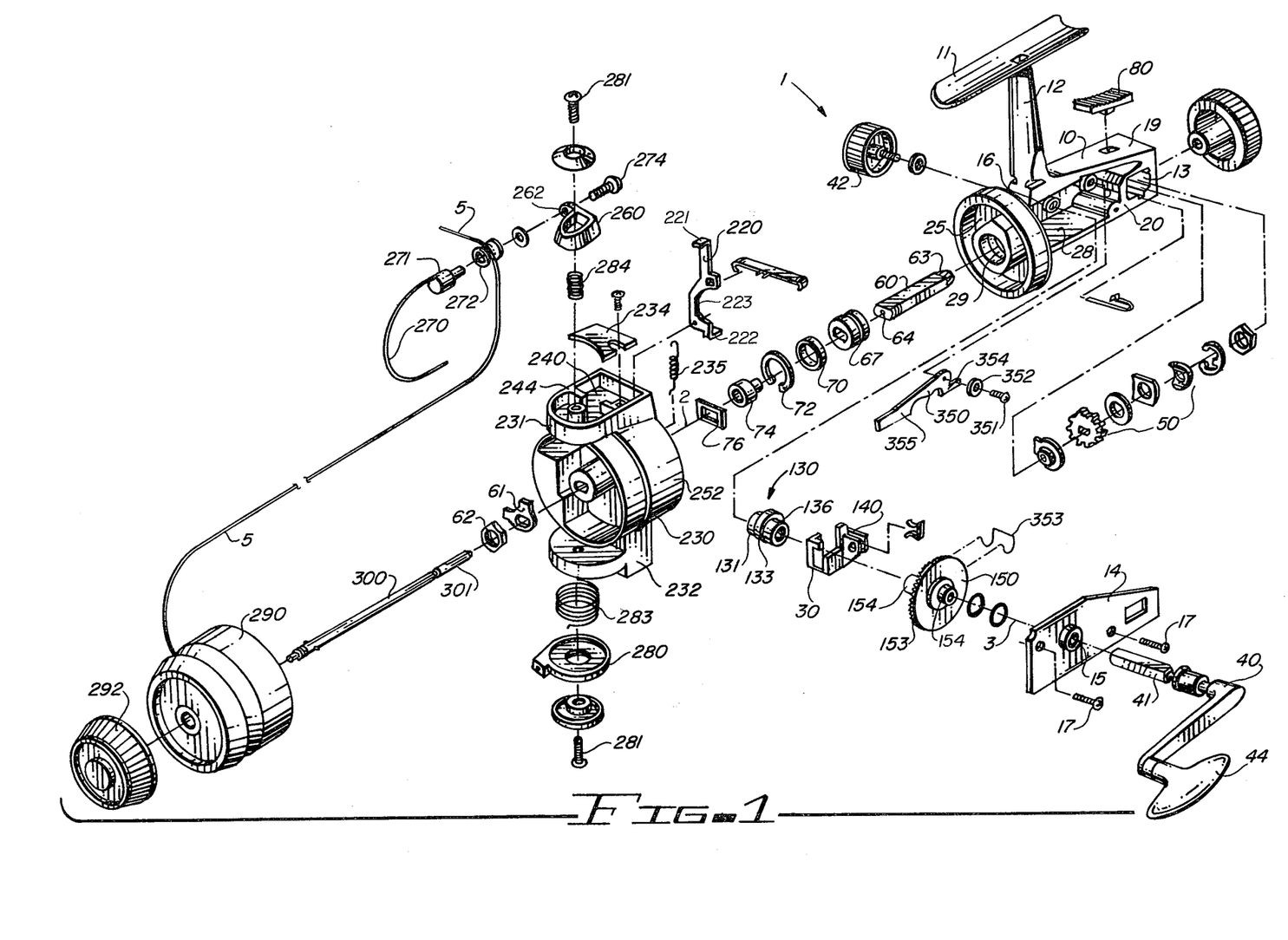
FIG. 1 is an exploded perspective view of the spinning style fishing reel containing the invention described herein.

In FIG. 1 an open face style fishing reel 1 is shown in an exploded perspective view. The reel 1 having a housing 10 which includes an integral gear case 28, a stem 12 which connects the housing 10 to a mounting foot 11 which is used to attach the reel to a spinning style fishing rod. The reel includes a crank assembly 40 rotatable about a crank handle shaft 41 with a rotatable winding handle 44 for use by a fisherman with his left hand for line retrieval while the rod (not shown) is being held by this right hand. The handle 44 may be disposed on the other side of the gear case 28 to accommodate the personal desires of the user.

An axially mounted rotor housing 230 is provided and adapted to rotate about the axis of the central spool shaft 300 as the crank 40 is turned for line retrieval with the line 5 being captured by the bail 270 passing over the line roller 272. The bail 270 and the line roller 272 rotate with rotor 230 and the fishing line 5 is thereby wound on the spool 290. The screws 281 function as pivot points and are accordingly the centers of rotation of the bail 270 via the bail arms 260 and 280.

An oscillator mechanism 30 causes the spool 290 to reciprocate axially back and forth as the rotor 230 winds a line 5 about the spool 290; but as in spinning reels generally, the spool 290 does not rotate about the axis of the central shaft 300 except as controllably permitted by the adjustable drag mechanism 50. Such limited rotation of the spool may occur during line retrieval when a fish is on the other end of the line 5 fighting for its life while still in the water; and, thus the force of the drag friction is overcome by tension in the line. This is a feature that prevents the internal mechanism from being destroyed when a large fish is on the end of the line 5. When the bail 270 is swung to an open position for casting, the line 5 may freely payout from the spool 290.

In the overall arrangement of the reel, a side cover plate 14 is secured to the housing 10 to cover the gear housing 28 which includes a drag pocket 13 and is accomplished by means of screws 17. The drive gear assembly 150 includes a drive gear 153 that is mounted on the drive gear shaft 154 and is received at one end in the side lip 136 of cam 130. Bearing collar 131 is coaxial with the lip 136 and mounted on the opposite side of the cam surface 133.

The gear assembly 150 and the oscillator cam 130 each have an internal hole and are coaxially mounted on the crank handle shaft 41 with the drive shaft 154 externally mounted in the side plate bearing 15 and the bearing collar 131 mounted in bearing 16 that is part of the side of the housing 10 and coaxial with bearing 15 (but not shown in FIG. 1). Oscillator slide yoke 140 surrounds cam surface 133 of the cam assembly 130 and is slidably mounted near the bearing 16 in the gear case 28. Retainer screw 42 secures the crank handle shaft 41 to the reel 1. As can be readily appreciated, the crank assembly 40 can be removed from the reel 1 and reversed so that the reel 1 can be held by a fisherman in his left hand and cranked by his right hand.

Pinion assembly 60 is mounted in the front hole 29 of the front face 25 and surrounded by bearing 70 which is kept in place by retainer 72. Mounted inside the gear case 28 on the pinion assembly 60 is the self-centering ratchet 67. In front of retainer 72, a spacer ring 74 and a trip lever retainer 76 are mounted on the pinion 60. The rotor 230 is mounted on the pinion assembly 60 in front of retainer 76 and is secured thereto by means of washer 61 and nut 62. Center spool shaft 300 is rotatably mounted in and supported by the pinion assembly hole 64 with the back end 301 thereof extending past the partition 20 into the drag assembly 50. The spool 290 is mounted on the shaft 300 and secured thereto by means of spool cap 292. The shaft 300 is secured to the oscillator yoke slide 140 and reciprocates back and forth relative to the rotor when the crank handle shaft 41 rotates.

Pinion gear 63 mounted at the back of the pinion assembly 60 mates with the drive gear 153 and is rotatable thereby. The pinion assembly 60 in turn causes the rotor 230 to rotate about the spool 290. Because the oscillator cam assembly 30 and the gear drive assembly 150 are both operated by the crank assembly 40 at the same time, the spool 290 reciprocates back and forth relative to the rotational motion of the line roller 272 about the spool and by this cooperative movement the line 5 is wound around the spool 290.

The axis 2 of the rotor 230, shaft 300, pinion assembly 60, and drag assembly 50 is approximately perpendicular to the axis 3 of the crank handle assembly 40, oscillator mechanism 30 and the drive gear assembly 150. The axis 2 is located above the axis 3 being nearer to the foot 11.

The bail 270 is normally stored in the "closed" or "retrieve" position whereby the line roller 272 functions to wind the line 5 about the spool 290 by turning the handle 44 relative to the reel 1. When the bail 270 is to be open or placed in the "casting" or "open" position, the bail 270 is pivoted about the L-shaped bail ears 231 and 232 and locked in place by the trip lever 220 that is received by the cam 261 and trip ramp 264 surfaces located on the underside of the bail arm 260 (not shown in FIG. 1); the underside of bail arm 260 faces into the cavity of the ear 231.

In the casting position, the line 5 is free to payout from the spool 290. During casting, this payout of the line is quite rapid, thus, the fisherman using this open faced style fishing reel is obligated to use his finger to snub the line to arrest the payout since neither the rewind or line retrieval mode (the winding of the line about the spool 90 by the line roller 272) or the drag mechanism 50 is operational. In order to change the bail from the "open" casting position to the "closed" rewind or retrieve position, the rotor 230 is rotated causing the trip lever 220 to disengage from the trip ramp 264 permitting the bail return springs 283 and 284 to pivot the bail 270 back to the retreive position.

A feature of this fishing reel is a self-centering bail mechanism that permits the rotation of the rotor 230 to the same position for opening the bail 270 at the optimum casting position. A self-centering lever arm 350 is mounted within the gear case by means of screw 351 and washer 352 with the back end 354 of the arm 350 in operable engagement with the self-centering button 80. The lever arm spring 353 mounted on the drive gear shaft 154 urges the pawl end 355 toward the ratchet 67. But, with the button 80 in the back position, the pawl 355 is pivoted out of engagement with the ratchet 67. When the button 80 is in the forward position closer to the stem 12 and farther from the drag assembly 50, then the bottom of the button 80 permits the pawl end 355 of the arm 350 to come into contact with the ratchet 67 so that the rotor 230 can be rotated "backwards" (counter to the direction of rotation for winding the line around the spool) to a pre-selected position for opening the bail at the casting position. The same mechanism acts as an anti-reverse device for the reel so that the rotor can only be rotated "backward" less than one revolution.

DESCRIPTION OF THE PREFERRED EMBODIMENTS

Figures 2, 10, 11, 12:
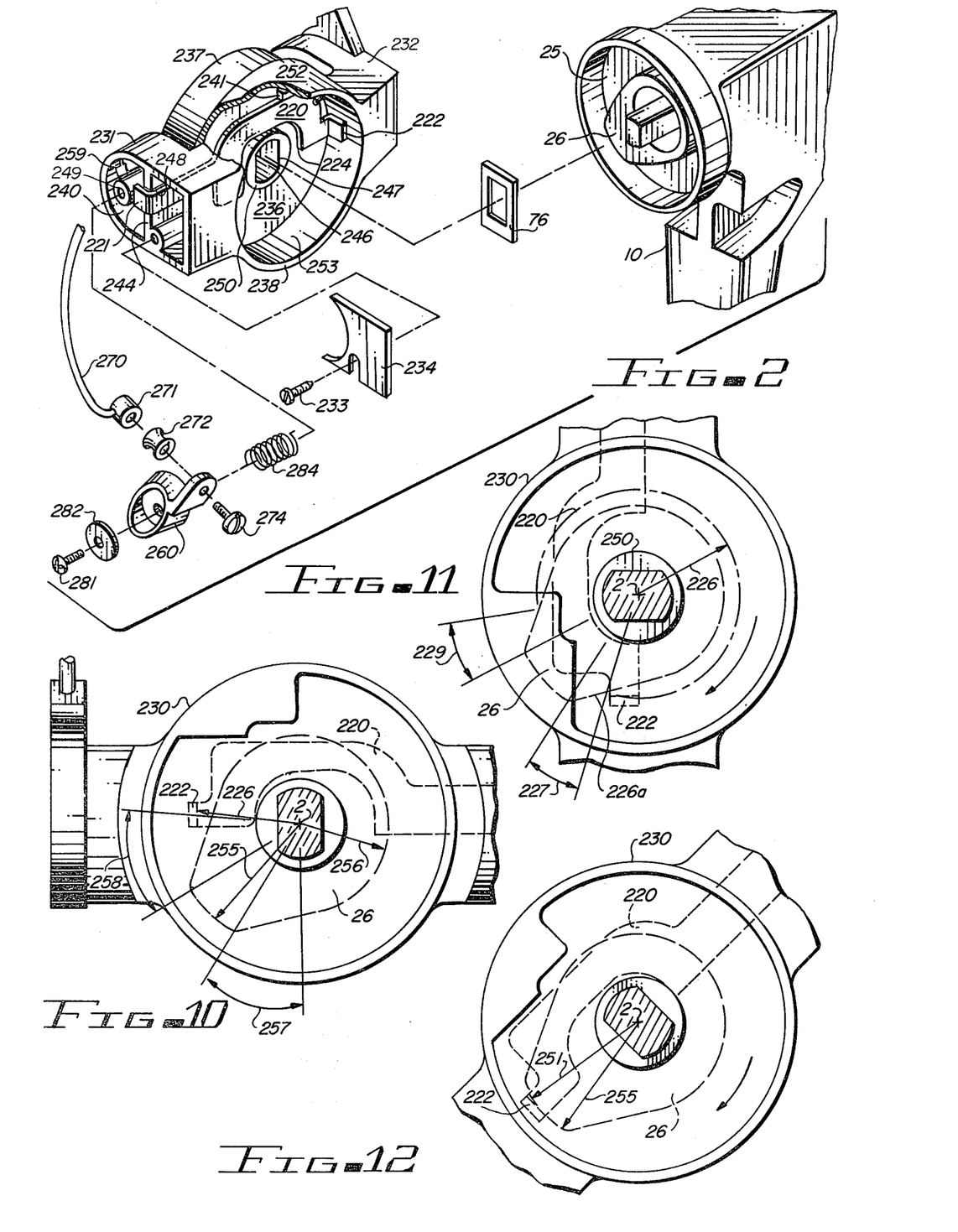
FIG. 2 is a partial exploded perspective view of a portion of the spinning reel containing the invention described herein.
FIG. 10 is a partial front view of the rotor of the fishing reel incorporating the invention herein with the bail in the casting position.
FIG. 11 is a partial front view of the rotor of the fishing reel incorporating the invention herein with the bail in the casting position.
FIG. 12 is a partial front view of the rotor of the fishing reel incorporating the invention herein with the bail in the retrieving position.
Figure 3:
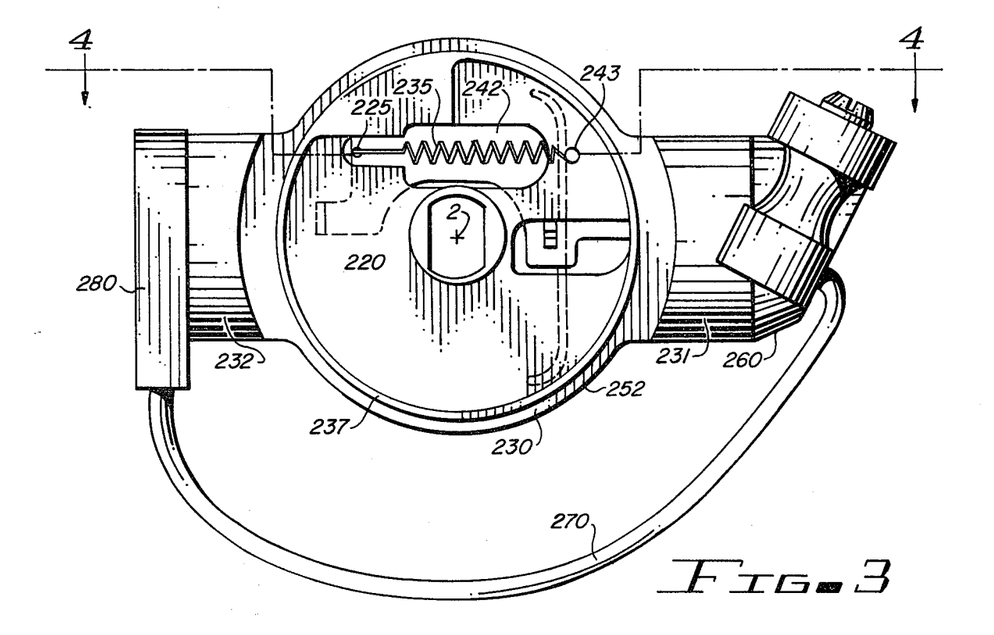
FIG. 3 is a front elevation view of the rotor of the fishing reel containing the invention herein.
Figure 4:
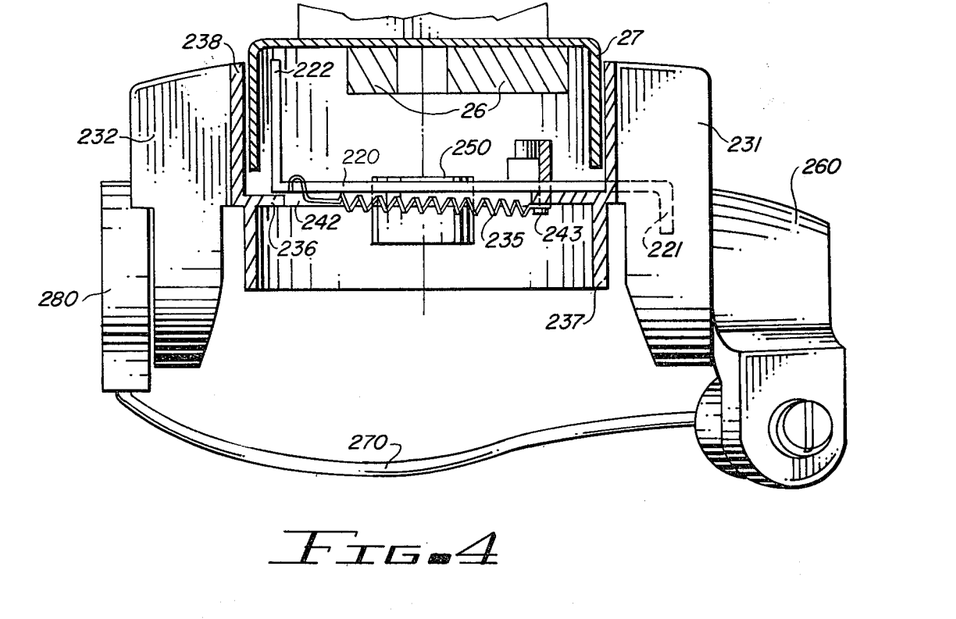
FIG. 4 is a cross-sectional view taken through the rotor of FIG. 3.
Figure 5:
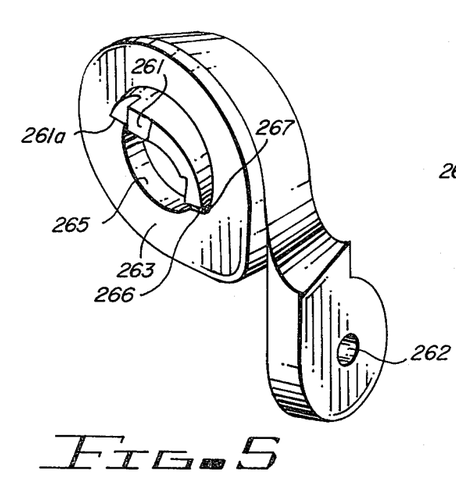
FIG. 5 is a perspective view of the underside of a bail arm used in conjunction with an embodiment of the invention described herein.
Figure 5A:
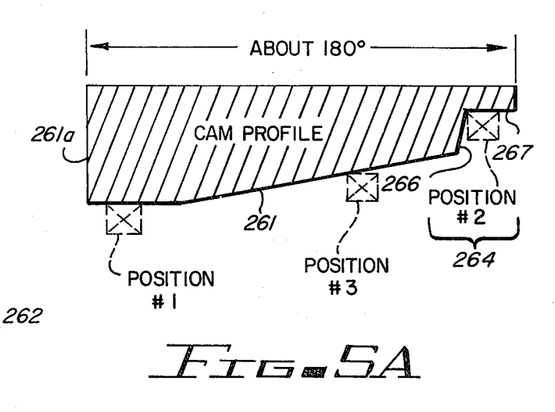
FIG. 5A is a cam profile of the cam and trip ramp surfaces located on the inside surface of the bail arm of FIG. 5.
Figures 7, 8:
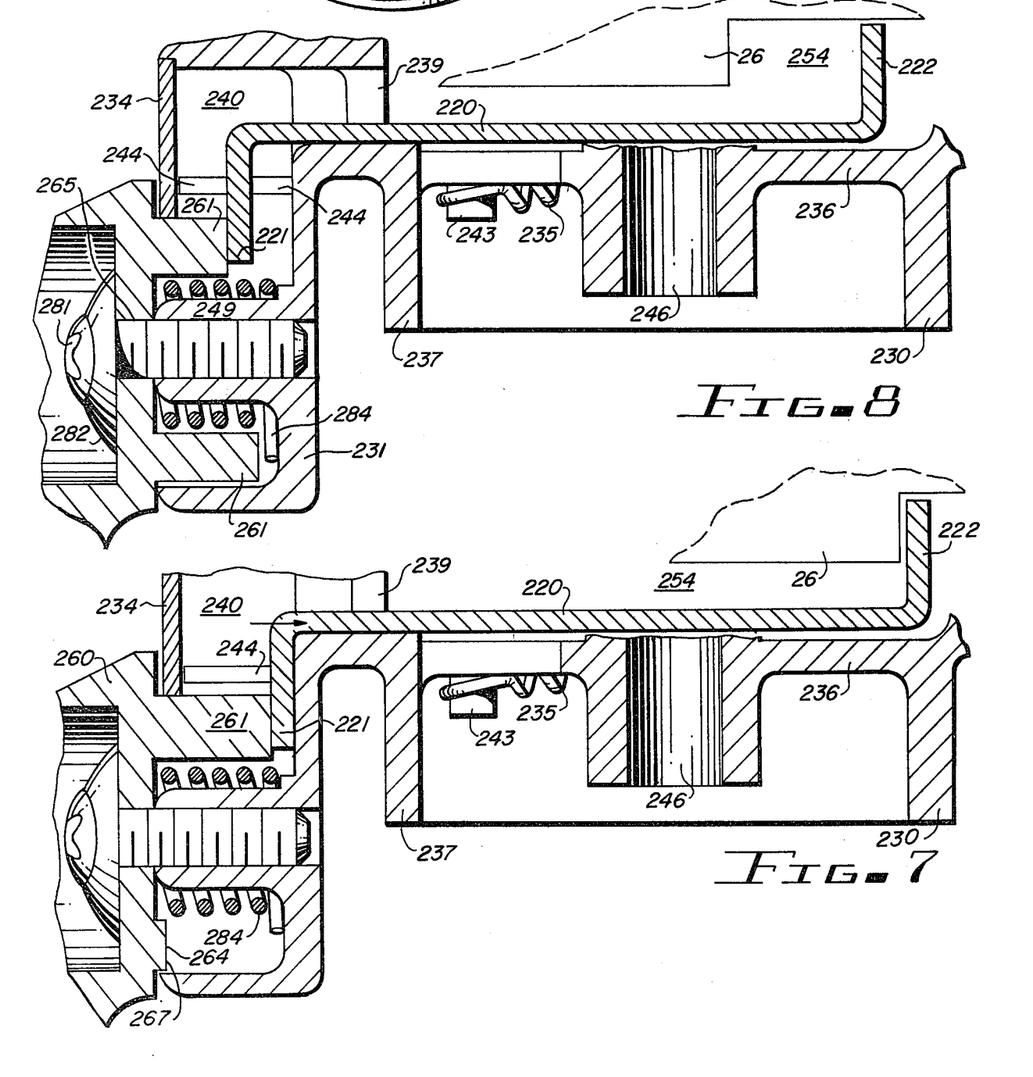
FIG. 7 is a cross-sectional view of a part of the rotor of the fishing reel incorporating the invention herein wherein the bail and trip lever are in a retrieving position.
FIG. 8 is a cross-sectional view of a portion of the rotor of the fishing reel incorporating the invention herein wherein the rotor and trip lever are in a position where the bail is halfway between the casting position and the retrieving position.

In a preferred embodiment of the invention bail 270 mounted on bail arms 260 and 280 is manually pivoted to the casting position and is automatically pivoted (re-pivoted) to the retrieve position. The bail assembly 271 and line roller 272 are mounted in bail arm hole 262 by means of screw 274. The rotor 230 has a central deck 236 with a front projecting open cylinder 237 extending toward the front of the reel with spool 290 surrounding a major portion of the cylinder 237. Extending from the deck 236 toward the back 19 of the reel housing 10 is a back projecting open cylinder 238 (FIG. 2) that substantially surrounds the front spool end 25 of the housing 10 including the front face cam 26 and trip lever retainer washer 76, as shown in FIG. 2. The rotor ears 231 and 232 are part of the exterior surface 252 of cylinder 238 with radial passage 239 extending from the bowl 253 (defined by the back cylinder 238) into the cavity 240 of the L-shaped rotor ear 231. A partition 244 divides the cavity 240 into a passage section and a bail arm mounting section. The bail arm 260 is pivotally secured in the cavity 240 to the post 249 by means of screw 281 and washer 282 as shown in FIG. 8. On the inside or underside surface 263 of the bail arm 260 as shown in FIG. 5 is a sloping cam surface 261 and an adjacent trip ramp 264. The trip ramp 264 has a flat dwell portion 267 and a steep sloping drop off portion 266. A profile of the cam surface 261-trip ramp 264 projecting outwardly from the underside surface 263 is depicted in FIG. 5A. Surface 261 and ramp 264 comprise approximately only one-half or 180° of the circumferential surface 263 located around hole 265.

When the bail arm 260 is rotated to the casting position, its rotational motion is limited by the cam edge 261a contacting stop 259 located in the bail mounting section of the cavity 240. And, when the bail 270 is pivoted to the retrieve position, the trip ramp 264 contacts the stop 259 limiting the motion of the bail arm 260. As shown in FIGS. 2 and 10-12, a face cam 26 can be part of the housing 10 with the cam 26 having a minor radius 256 (FIG. 10) and a major or maximum radius 255. The cam rise, the angular displacement 257 on the cam 26 of the change from the minor radius 256 to the maximum radius 255, and the cam fall, the angular displacement 258 on the cam 26 of the change from the major radius 255 to the minor radius 256 are shown as being substantially equal; however, they may be altered, if desired.

An elongated trip lever 220 is mounted on the back of the deck 236 in the bowl 253. The lever 220 has a cutout section 223 (FIG. 6) enabling the lever 220 to slide back and forth clearing the hub 250. The trip end 221 contacts the underside 263 of bail arm 260 before the stop 224 contacts the hub 250. The trip end 221 of the lever 220 is mounted in the cavity 240 adjacent and in constant contact with either the bail cam 261 or the trip ramp 264. A cam follower 222 is mounted at the other end of the lever 220 and projects into the area formed between the deck 236, the back cylinder 238 and the front face 25 which is defined as the pocket 254 (FIGS. 7 and 8). Trip lever 220 has a hole 225 to which is connected one end of the spring 235 which passes partially through an elongated slot 242 in deck 236. The other end of the spring 235 is connected to post 243 on deck 236. Thus, the cam follower 222 is constantly being forced radially inwardly toward the central axis 2 and the trip end 221 is concomitantly being forced radially outwardly against the cam 261 or the trip ramp 264 in cavity 240 by spring 235. Stub 241 (FIGS. 2 and 6) on deck 236 provides a guide means for lever 220. In the cavity 240 the partition 244 has a slot 248 that also acts as a guide means for the trip end 221 of lever 220. The combination of guide means 241 and 248 prevent the lever 220 from twisting or rotating relative to the deck 236.

As illustrated in FIG. 7, when the bail 270 is in the retrieve position, the trip end 221 is forced radially inwardly by the cam 261 toward the axis 2 and the cam follower 222 is forced radially outwardly from the axis 2. The relative position of the trip end 221 with respect to the cam 261 is indicated by dotted lines designating Position No. 1 on the cam profile shown in FIG. 5A. The rotor 230, the rotation of the cam follower 222 and the cam 26 are all coaxial with respect to the center axis 2. When the rotor 230 rotates, the follower 222 will trace a path with a radius 251 around axis 2; radius 251 being longer than radius 255 of the cam 26 and thus the follower will not contact the cam 26, as illustrated in FIG. 12.

Figure 6:
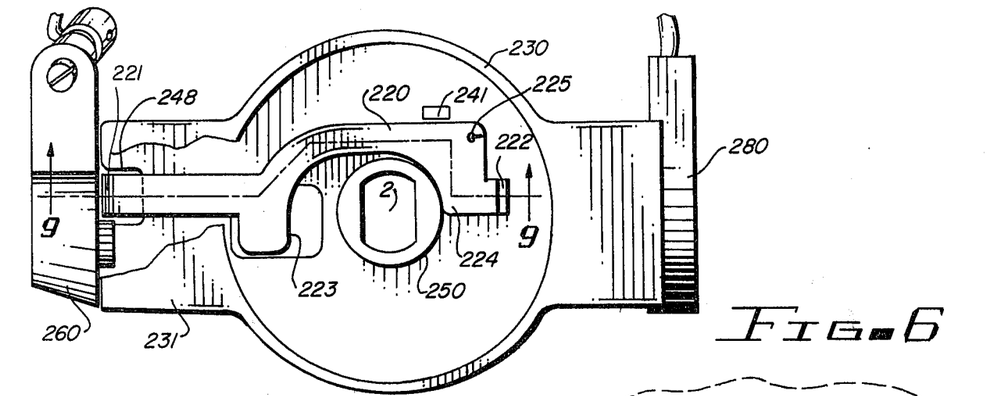
FIG. 6 is a back end view of the rotor of the fishing reel containing the invention described herein.
Figure 9:
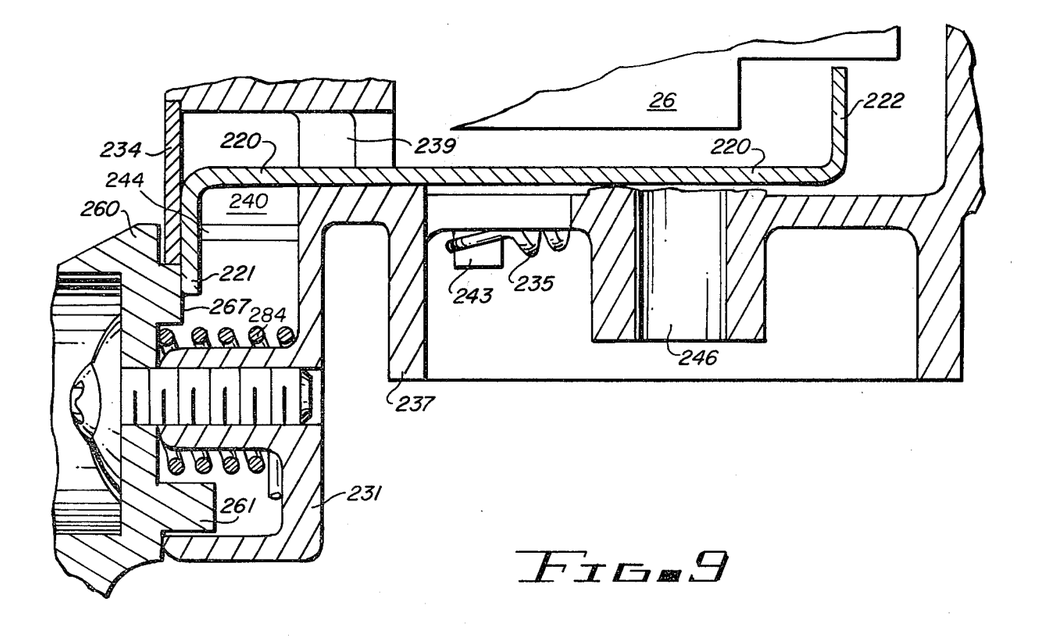
FIG. 9 is a partial cross-sectional view of the rotor and trip lever incorporating the invention herein that is similar to the views shown in FIGS. 7 and 8 and is taken along line 9—9 of FIG. 6.

When the bail 270 is in the casting position, as illustrated in FIGS. 6 and 9, the spring 235 forces the trip end 221 against the dwell portion 267 of the trip ramp 264 and radially outward from the axis 2 with the stop 224 bearing against hub 250. Concomitantly the follower 222 moves radially inwardly towards the axis 2. As shown in FIGS. 10 and 11, the follower 222 traces a partial rotational path around the axis 2 with radius 226, which is larger than radius 256 but smaller than radius 255. In the casting position, the trip end 221 is against the dwell 267 with the side of the end 221 locked against the drop off 266 preventing the rotation of the bail arm. The relative location of the end 221 is depicted by dotted lines on the cam profile of FIG. 5A and designated as Position No. 2. The relative positions of the rotor 230, the trip lever 220 with the cam follower 222 and the face cam 26 are shown in FIG. 10 just after the bail has been positioned by the self-centering mechanism and cocked to the casting position.

With the bail in the casting position and a desire by the fisherman to retrieve the line, the crank handle 44 is rotated so that the rotor 230 and the follower 222 rotate clockwise about the axis 2, the path traced by follower radius 226 indicates that the follower 222 contacts the cam 26 at point 226a. As the rotor 230 continues to revolve about axis 2, as shown in FIG. 11, follower 222 is forced radially outwardly as it rides up the surface of cam 26. This cam rise is depicted by the angular displacement 227 and is approximately equal to the angular displacement 229 of the cam fall. Near the end of the rapid outward radial displacement of the follower 222 caused by the cam surface 26, the trip end 221 is pulled away from the trip ramp 264 and contacts the incline of the cam 261. With the drop off 266 no longer bearing against the trip end 221, the spring 284 and, if desired, spring 283 cause the bail 270 to pivot to the retrieve position. Position No. 3 of FIG. 5A and FIG. 8 illustrate the location of the trip lever 220 and the bail arm 260 when the bail 270 is approximately halfway between the casting position and the retrieving position.

In order to cause the rapid pivoting of the bail 270 from the casting position to the retrieve position the angular displacements 257 and 258 must be relatively small. The differences between the outer cam radius 255 and follower radius 226 and the angular displacements 227 and 228 must also be small. Preferably the angular displacements 257 and 258 range from 25° to 60° and more preferably range from 40° to 50°. It has been found that the angular displacements 227 and 229 for the radial movement of the cam follower 222 preferably should range from 10° to 25° and more preferably range from 12° to 16° in order to provide for rapid change from the casting position to the retrieving position. It is to be appreciated that the difference between the radius 226 and radius 255 must be greater than the rise of the drop off 266 between dwell 267 and the start of cam 261 or the bail cannot be pivoted from the casting position to the retrieving position.

Latch cover 234 is secured to the L-shaped ear 231 by means of screw 233 to enclose the passageway portion of the cavity 240. If the self-centering bail mechanism were to be made inoperative and since the cam rise and fall are substantially the same, the rotor 230 can be rotated either in the clockwise direction or in the counterclockwise direction to rapidly change the bail 270 from the casting position to the retrieving position. However, it is customary to only rotate the rotor 230 in the clockwise direction.

The trip lever retainer 76 has a flat sided hole and the rotor 230 has flats 247 in hole 246 that correspond to the milled flats on the pinion assembly 60. This enables the retainer 76 to be mounted adjacent the hub 250 to provide axial support for the trip lever 220.

It should be understood, of course, that the specific forms of the invention illustrated and described herein are intended to be representative only, as certain changes and modifications may be made without departing from the scope of the teachings herein disclosed. Accordingly, reference should be made to the appended claims in ascertaining the full scope of the invention.

What is claimed is:

1. In an open faced spinning reel used for casting a bait attached to a fishing line and for retrieving the bait and fishing line after casting,
   (1) the reel having a housing with a front forward spool end face, a back end and a central passageway extending from the face to the back end defining a central axis,
   (2) a pinion assembly mounted in the housing,
   (3) a center shaft rotatably mounted in the housing and coaxial with the central axis,
   (4) a spool mounted on the shaft for holding the fishing line,
   (5) a handle and gear train assembly mounted in the housing,
   (6) a rotor having a movable bail for winding the fishing line about the spool in the retrieving position being coaxial with the central axis, mounted adjacent the face of the housing and rotatable by cooperative movement of the gear train and pinion assemblies,
   (7) the movable bail mounted on the rotor having an open casting position and a closed retrieving position, the improvement being an internally mounted mechanism for automatically changing the bail from the casting position to the retrieving position comprising:
   (a) a first cam mounted on the forward face of the housing coaxial with the central axis;
   (b) the rotor comprising:
       (1) a central deck having a front opening cylinder extending toward the front end of the reel and a back opening cylinder extending toward the back of the reel having an internal bowl and an external surface,
       (2) first and second L-shaped ears secured to the exterior surface of the back cylinder and directed toward the front of the reel, the first ear having an L-shaped cavity and a radial pasageway connecting the cavity with the internal bowl,
       (3) the rotor bowl surrounding the first cam defining a rotor pocket,
       (4) a raised hub extending from the deck toward the back of the reel and inside the internal bowl;
   (c) the bail being U-shaped with two ends;
   (d) first and second bail arms, each one of the bail arms being mounted in one bail arm, the first bail arm pivotally biasably mounted in the first ear and the second arm pivotally mounted in the second ear to permit rotation of the bail from the casting position to the retreive position, the first bail arm having a second cam and a trip ramp projecting into the L-shaped cavity;
   (e) Z-shaped elongated trip lever means slidably mounted on the deck in the rotor pocket and having a cam follower in the internal bowl adjacent the first cam and a trip end extending into the cavity of the first ear adjacent the second cam and trip ramp, the lever means being substantially perpendicular to the central axis and having a cut out section through which the hub extends, the cut out section defining a stop for engagement with the hub when the trip end is out of engagement with the first cam and trip ramp;
   (f) means for biasably urging the cam follower towards the central axis and the trip end against the second cam and trip ramp;
   (g) in the retrieving position the second cam depressed the trip end radially inwardly toward the axis overriding the biasably urging means and moving the cam follower radially outwardly from the central axis;
   (h) in the casting position the trip end is urged radially outwardly from the central axis by the biasably urging means and seated against the trip ramp locking the bail open for casting and moving the cam follower radially inwardly toward the central axis;
   (i) rotation of the rotor when the bail is open or in the casting position causes the cam follower to contact the first cam and rapidly move outwardly from the central axis with the trip end concomitantly being withdrawn from against the trip ramp unlocking the bail permitting the bail arms to pivot the bail to the closed retrieve position.

2. The reel of claim 1 wherein the stop contacts the hub thereby limiting the travel of the cam follower toward the center axis when the bail is in the casting position.

3. The reel of claim 1 wherein the deck has guide means for directing the sliding motion of the trip lever means.

4. The reel of claim 1 wherein the deck has an elongated slot adjacent the hub and substantially parallel to the direction of the sliding movement of the trip lever means.

5. The reel of claim 4 wherein the means for biasably urging comprises a spring.

6. The reel of claim 5 wherein one end of the spring is attached to the deck and the other end attached to the trip lever means, the spring partially mounted in the elongated slot.

7. The reel of claim 1 wherein the first cam has a major diameter and a minor diameter radially spaced from the central axis but concentric therewith.

8. The reel of claim 7 wherein the change from the minor diameter to the major diameter is defined as the cam rise and the change from the major diameter to the minor diameter is defined as the cam fall.

9. The reel of claim 8 wherein the cam rise comprises an angular displacement ranging from 25° to 60°.

10. The reel of claim 9 wherein the angular displacement ranges only from 40° to 50°.

11. The reel of claim 8 wherein the cam follower, when the bail is in the casting position, traces a diameter around the central axis that is larger than the minor diameter but smaller than the maximum diameter.

12. The reel of claim 11 wherein the cam rise between the cam follower displaced diameter and the major diameter comprises an angular displacement ranging from 10° to 25°.

13. The reel of claim 12 wherein the angular displacement ranges only from 12° to 16°.

14. The reel of claims 12 or 13 wherein the rise provided for the angular displacement contributes to the rapid movement of the cam follower outwardly from the center axis removing the trip end from the trip ramp unlocking the bail whereby the bail arms can pivot the bail to the close retrieve position.

15. The reel of claim 8 wherein the cam rise and the cam fall are substantially the same.

16. The reel of claim 15 wherein the bail can automatically be rotated from the casting position to the retrieving position by clockwise or counterclockwise rotation of the rotor.

17. The reel of claim 1 wherein the trip ramp comprises a sharp drop off portion adjacent the second cam and a dwell portion adjacent the drop off portion.

18. The reel of claim 17 wherein the trip end is in constant contact with the second cam until the bail is pivoted into the casting position.

19. The reel of claim 18 wherein the trip end is in contact with the dwell portion when the bail is in the casting position.

20. The reel of claims 12 or 13 wherein the small angular displacement provides a means for preventing inadvertent tripping of the bail during casting.

21. The reel of claim 1 wherein the L-shaped cavity has a partition dividing the cavity into the bail arm mounting area and a radial passageway area.

22. The reel of claim 21 wherein the trip end extends through the radial passageway into the L-shaped cavity.

23. The reel of claim 22 wherein the partition and guide means influence the movement of the trip end.

24. The reel of claim 21 further including a latch cover closing the radial passageway area.

* * * * *